United States Patent [19]

Breyer

[11] Patent Number: 5,425,180
[45] Date of Patent: Jun. 20, 1995

[54] METHOD FOR COORDINATE MEASUREMENT OF WORKPIECES

[75] Inventor: Karl-Hermann Breyer, Heidenheim, Germany

[73] Assignee: Carl-Zeiss-Stiftung, Germany

[21] Appl. No.: 13,695

[22] Filed: Feb. 4, 1993

[30] Foreign Application Priority Data

Feb. 15, 1992 [DE] Germany .................. 42 04 602.5

[51] Int. Cl.⁶ .................................. G01B 7/012
[52] U.S. Cl. ............................ 33/503; 33/504; 33/561
[58] Field of Search ............ 33/503, 504, 558, 561, 33/DIG. 13, 502, 556, 559

[56] References Cited

U.S. PATENT DOCUMENTS

| | | |
|---|---|---|
| 4,177,568 | 12/1979 | Werner et al. |
| 4,455,755 | 6/1984 | Fritsche et al. |
| 4,611,156 | 9/1986 | Feichtinger ............... 33/504 X |
| 4,817,362 | 4/1989 | Archer ..................... 33/561 X |
| 4,972,594 | 11/1990 | Gurney et al. ............. 33/558 X |
| 5,111,592 | 5/1992 | Aehnelt et al. ............ 33/561 |
| 5,228,352 | 7/1993 | McMurtry et al. ......... 33/558 X |

FOREIGN PATENT DOCUMENTS

| | | |
|---|---|---|
| 0426492 | 5/1991 | European Pat. Off. ....... 33/561 |
| 3831974 | 3/1990 | Germany . |

Primary Examiner—Alvin Wirthlin
Attorney, Agent, or Firm—Hopgood, Calimafde, Kalil & Judlowe

[57] ABSTRACT

In the measurement of workpieces on a coordinate measuring machine having a work-contacting probe head of the switching type, the course over time of the contact signal is stored within a time interval which at least spans the procedural time of contact-signal development. After comparison or correlation with a prerecorded sample signal which has also been stored, the exact time of initial contact or the exact scanning coordinates are then subsequently computed.

9 Claims, 3 Drawing Sheets

METHOD FOR COORDINATE MEASUREMENT OF WORKPIECES

BACKGROUND OF THE INVENTION

The present invention relates to a method for coordinate measurement of workpieces, using a probe head of the switching type to produce a signal upon contact with a workpiece to be measured, and to a coordinate-measuring machine suitable for carrying out the method.

Switching-type probe heads in use today are of two varieties. In one of these varieties, probe contact with the workpiece produces a switch signal, upon dislodging the normally seated position of a movable probe pin, thereby breaking an electrical-circuit through seat elements. In another variety, one or more highly sensitive piezoelectric elements in or near the probe pin produce an electrical pulse signal at the instant of workpiece contact.

It is also known, in a switching-type probe head, to provide for two different signals to be produced in the course of a given work-contacting procedure, namely, a piezoelectric signal plus an ensuing switch signal upon probe-pin dislodgement from its normally seated position. The respective signals from these two actions are somewhat staggered in time, since the seating switch opens later than the instant of sensitive piezoelectric-crystal excitation. Such probe heads are illustratively described in German OS 3,831,974 and in U.S. Pat. No. 4,177,568.

In order to determine the coordinates of the point of probe contact with the workpiece with such a two-signal switching-type probe head, it has to date been necessary to proceed as follows:

The scale-reading counter values of the respective coordinate-measuring systems (scale systems) of the coordinate-measuring machine are entered into intermediate storage when, for example, the piezoelectric signal intensity exceeds a predetermined trigger threshold. And if, within a predetermined ensuing period of 200 ms, the later seating-switch signal were to reach the control means of the machine, the piezo signal would be recognized as certifying a valid work-contact event, and the values that had been entered into intermediate storage would be entered into computer storage as the coordinate-measurement values. On the other hand, failure to produce a seating-switch signal within the predetermined period was cause for an automatic repeat of the measurement procedure, on the assumption (by the control means of the machine) that the piezoelectric signal was not an indication of a workpiece contact, but was for example a so-called "air contact" caused by noise or vibration, from the environment or from a bearing or a drive of the machine.

U.S. Pat. No. 4,455,755 also describes a method which is very similar to the one described above.

Although the known method is satisfactory in many situations, there are situations in which use of the method can lead to invalid measurements. If, for example, measurements are made on parts having a rough aluminum surface or, in general, workpieces are measured at slow speeds of workpiece contact, the signal of the piezoelectric element may not be produced, or it may be lost in the noise level. In such cases, even a repeat of the measurement does not produce a different result, and one must either increase the speed of workpiece contact, or the electromechanical switching signal produced by probe dislodgement from seated position must by itself assume the function of developing the work-contact signal. However, to rely on the seating switch alone is to lose precision measurement, since the seating-switch signal occurs later than the signal of the piezoelectric element and thus is no longer indicative of the time to establish exact contact coordinates of the point of workpiece contact.

BRIEF STATEMENT OF THE INVENTION

It is an object of the present invention to provide an improved method and means for using a probe head of the switching type in coordinate measurement of workpieces. And it is a specific object to overcome the above-mentioned disadvantages by more precisely determining the instant of workpiece contact so that contact coordinates can be determined more precisely, particularly when in slow-speed probe contact with a relatively soft surface.

The invention achieves these objects using a probe head of the switching type, in conjunction with computer-stored values of coordinate-position correction, the stored values being for a predetermined period of time which exceeds the expected interval of time to normally complete and validate a work-contact event, so that true and exact time and coordinates of workpiece contact can be established after the event.

In accordance with the invention, the time variation of the contact signals and the measured position values (x, y, z) of the scale-measurement systems of the coordinate-measuring machine are stored during a sufficiently large time interval before, during and after the instant of contact between the probe pin (or probe ball) and the workpiece, and the exact instant of workpiece contact is subsequently computed. Since in this case the entire course of a developing workpiece-contacting contact signal is available for the computation or interpolation of the instant of contact, substantially more accurate results can be obtained with this method. The precision of coordinate measurement is then no longer dependent on whether, for example, an interference pulse accidentally superposed on the contact signal causes a trigger threshold to switch too early or too late.

The method is suitable not only for probe heads which rely on highly sensitive sensors such as piezoelectric elements to supply the contact signal, but also for probe heads which generate the contact signal solely from switch action in the seat for normal positioning of the probe pin. The method can be used to particular advantage in connection with probe heads which supply a different signal from each of two different sensors, in which case it is advisable to store the course of both signals over time.

It is furthermore not necessary to store the contact signal in the form supplied by the sensor. Before its storage, the sensor signal can also be rectified and/or filtered, in which case, a "simpler" signal is presented and can be later evaluated, thus involving less storage capacity and/or a smaller bandwidth requirement for signal evaluation.

In computing the exact instant of workpiece contact, it is particularly advantageous if the stored signal course is correlated with the signal course of one or more sample signals. In such case, the method of the invention makes it possible to subject the computed instant of workpiece contact to a plausibility check. This can be done by repeating the process of workpiece contact, should the correlation of the stored contact signal with the sample signal be less than a predetermined correlation factor. And only if the correlation exceeds the predetermined limit value, will the exact contact time or the corresponding contact position be subsequently interpolated from the course of the signal.

The control means of the coordinate-measuring machine will be understood to include an evaluation unit which performs the requisite correlation, and this evaluation unit has sufficient storage capacity to accommodate several courses of sample signals, illustratively as a function of (a) probe speed in approach to and at the time of workpiece contact, (b) the pairing of workpiece materials, for the sample as well as for the measurement, or (c) additional parameters such as probe-pin length or probe-ball diameter. With such a variety of stored signals, the correct stored signal can be selected based on machine parameters which apply for the contacting procedure adapted for the particular point to be contacted for measurement on the workpiece.

DETAILED DESCRIPTION

A preferred embodiment of the invention will be described in detail, in conjunction with the accompanying drawings, in which.

Figure 1:
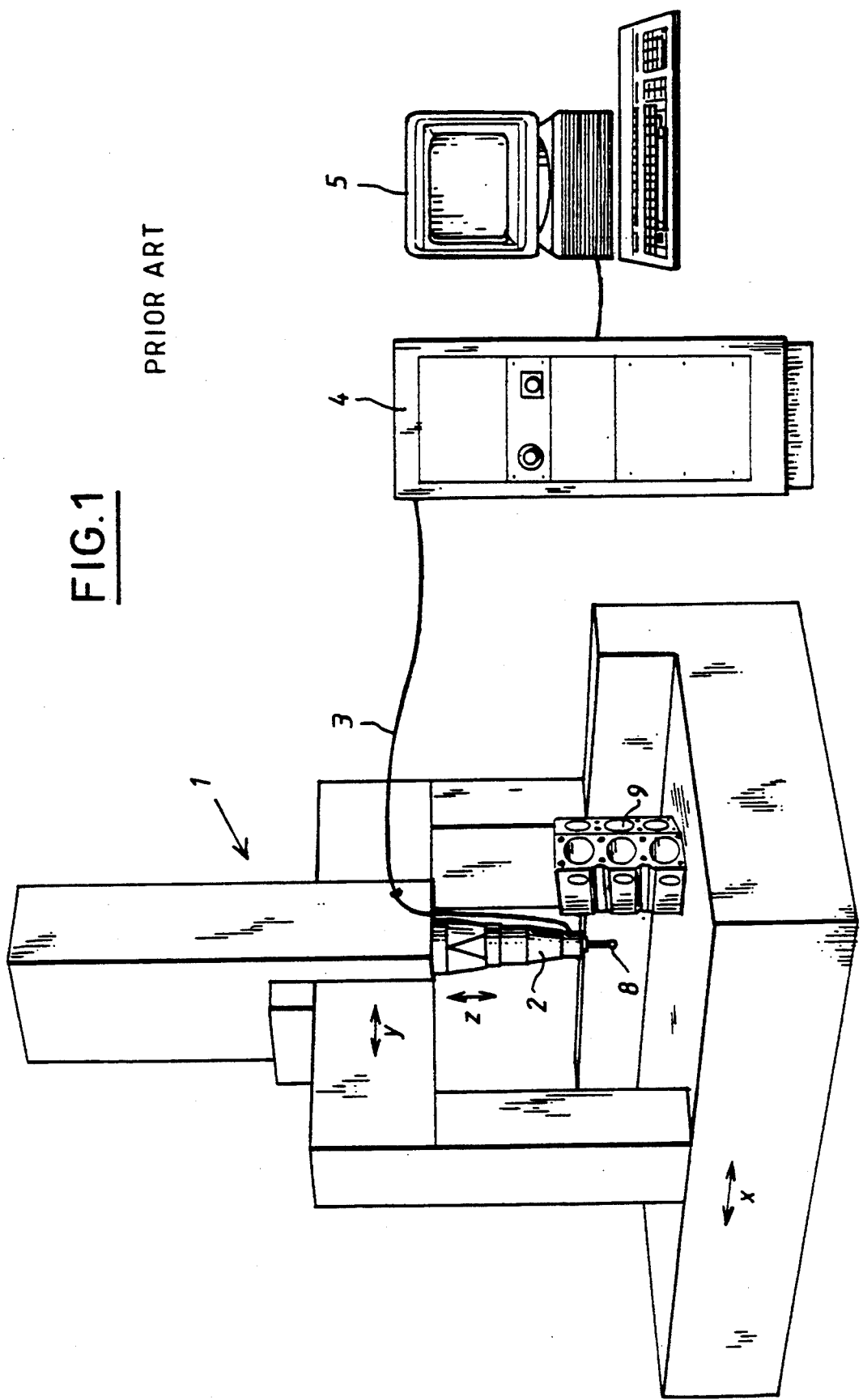
FIG. 1 is a simplified view in perspective of a coordinate-measuring machine suitable for performing the method of the invention.

The simplified coordinate-measuring machine 1 of FIG. 1, has a probe head 2 with a probe ball 8 at the outer end of its probe pin, and a point on the surface of a workpiece 9 is to be measured, upon ball contact with the workpiece. Reference numeral 4 designates the control unit of the coordinate-measuring machine, and reference numeral 5 designates an associated evaluation computer. Probe head 2 is connected to the control unit 4 via a signal cable 3.

Figure 2:
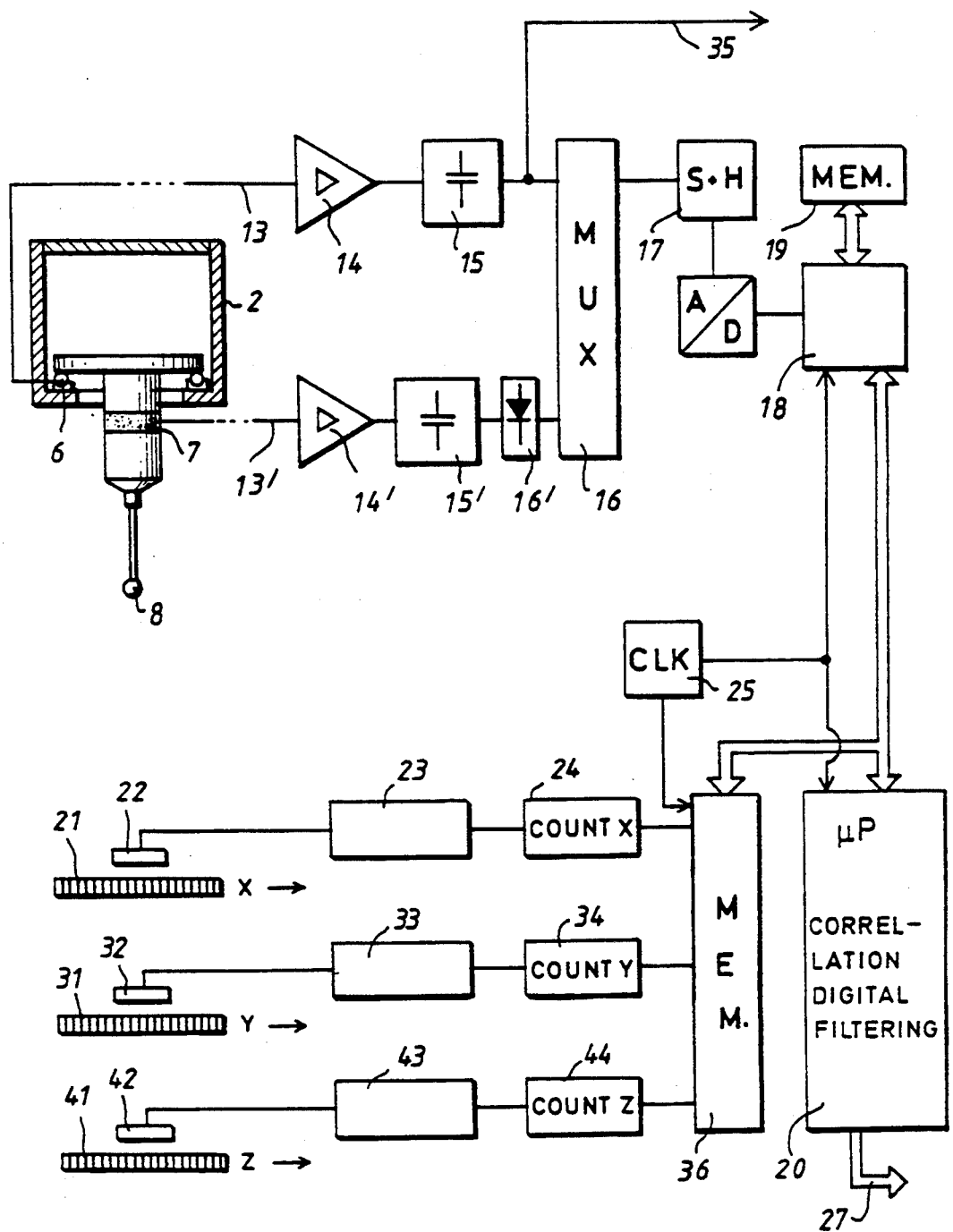
FIG. 2 is an electrical block diagram schematically showing signal-generating and processing components for performing the method of the invention.

In the diagrammatic showing of FIG. 2, the probe pin, with ball 8 at its outer end, is movably mounted on balls, with respect to the machine mountable probe head 2. Specifically, cylindrical bodies of the probe head (at 120° spacing) engage in three similarly spaced pairs of balls carried beneath the base flange of the probe pin; in the normally seated relation of the probe pin in relation to the probe head 2, electrical continuity will be understood to be established via the seated contact between all ball pairs and their associated cylindrical bodies, defining three seating switches 6 that are electrically in series. Reference numeral 13 identifies the signal-output line for this first or seating-switch signal. The switch signal 13 is seen to pass via an amplifier stage 14 and a filter stage 15 to one of two inputs of a multiplexer 16.

In addition, the probe pin is seen to incorporate a piezoelectric sensor 7 which, via a second signal line 13', is applied to the input of a second preamplifier 14'. The output of amplifier 14' is connected to a high-pass filter 15', and the thus-filtered piezoelectric signal is in turn fed to a rectifier stage 16', before application as the second input to multiplexer 16.

The output of the multiplexer 16 is connected to a sample-and-hold stage 17, which is alternately interrogated in a time-division multiplexing of the intensity of the rectified and filtered signals of the piezoelectric crystal 7 in interlace with those of the mechanical switch 6, before passage to a signal-processing device 18. The device 18 is connected to storage units at 19, in which the time variation of the signal sequences is then stored.

It is, of course, not necessary to store the signal sequences during the course of a complete measurement operation. Rather, an intermediate storage of the signals is sufficient. Stored signals can be erased and the memory can be cleared once a measurement has been recognized as valid in the course of evaluation, which will be described further below.

The transfer of data into storage 19 is synchronized by the machine pulse of a clock-pulse generator 25 and is effected in very short time intervals of, for example, 10 $\mu$s. The contact signal of the mechanical switch 6 is also fed via an additional signal line 35 directly to the control unit 4 of the coordinate-measuring machine. When a work-contact event opens switch 6, the control unit terminates further advancing drive of the probe head, preferably after making a plausibility check, and then the control unit reverses the probe head drive to withdraw the probe pin away from the workpiece 9.

Figure 3:
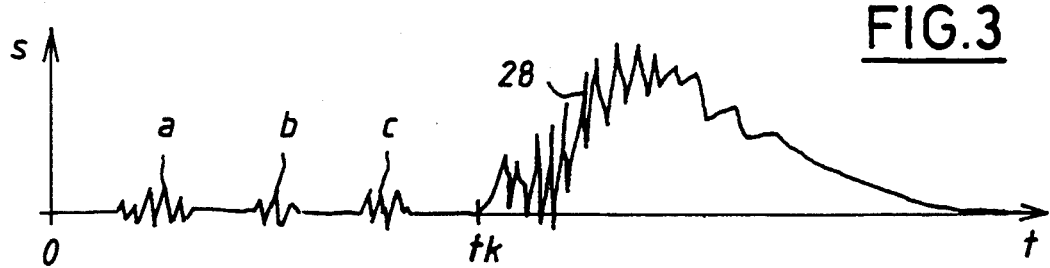
FIGS. 3 to 7 are successive graphical diagrams to the same time scale, showing contact-signal or sample-signal development in various stages of signal processing within the circuitry of FIG. 2.

FIG. 3 shows the time-varying course of a typical signal generated by piezoelectric crystal element 7 on signal line 13'. Three spurious or false pulses a, b, c, are assumed to have occurred prior to the time tk of initial contact with the workpiece, whereupon a piezo signal 28 is produced, consisting of a direct or d-c component and an alternating or a-c component. This signal course is typical for a machine-driven program of workpiece engagement by the probe element 8. The direct component represents or is attributable to a force signal of the probe pin which has become spring-loaded against the surface of the workpiece. The alternating signal superposed on the direct signal is not caused by interference pulses but represents the acoustic wave produced in the course of further probe-head advance, after initial contact with the workpiece.

Figure 4:
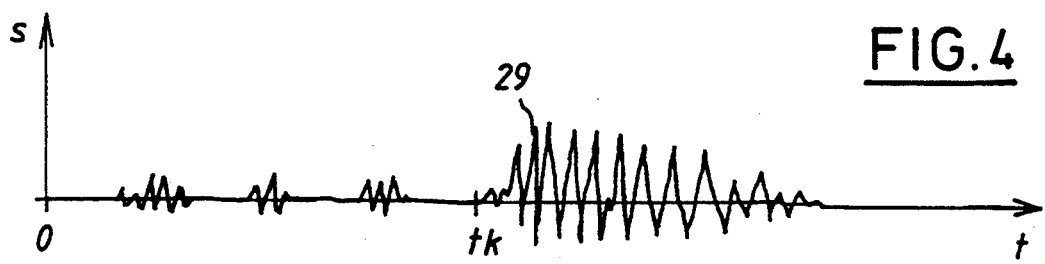
Figure 5:
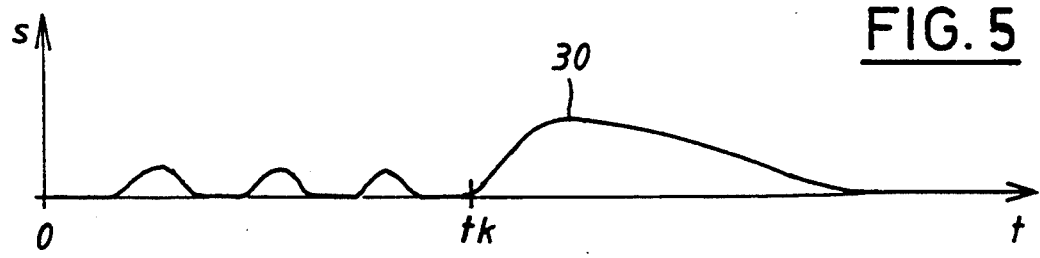

After passage through the high-pass filter 15', the signal 29 of the piezoelectric crystal element 7 has the course shown in FIG. 4; and after passage through the rectifier stage 16', the time-varying course 30 is as shown in FIG. 5, all resulting from the piezoelectric signal. The course of said signal 30 is entered into storage means 19.

Concurrently with the FIG. 3 period of probe-head feed into and beyond the point of initial contact with the workpiece, incremental measurement systems of the coordinate-measuring machine are continuously operative. Specifically, reading heads 22, 32, and 42 coact with the x, y, and z-axis measurement scales of the machine for digital interpolation at 23, 33, and 43 and counting at modules 24, 34, and 44. And the respective counter outputs are supplied to a second storage unit 36, in which time-variation of the respective counter readings is stored in synchronism with a clock-derived machine pulse rate, for example as stepped values taken at time intervals of one millisecond.

It will be understood that the nature of storage unit 36 is to provide for interim storage during a time interval of approximately one second. Such a time interval covers all the measurement data read during a work-contacting event. Data older than one second can be erased and overwritten by new scale-measurement data.

Figure 6:
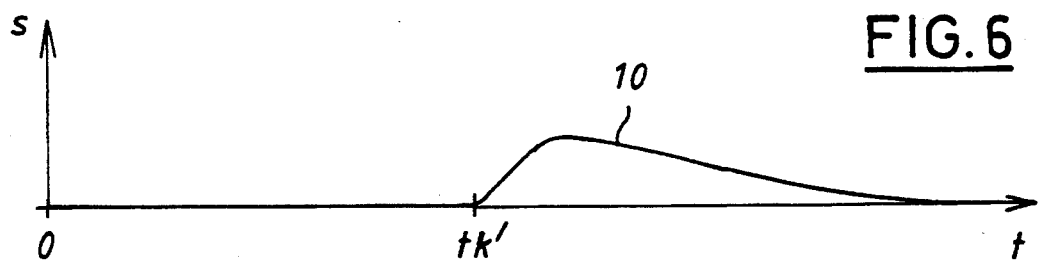

The signal-processing unit 18 recognizes the occurrence of a work-contacting event; for example, due to the fact that the signal sequence supplied by the probe-switch 6 has exceeded a predetermined trigger threshold during a predetermined period of time. When this occurs, the signal-processing unit 18 passes to a microprocessor 20 the stored signal sequence 30 of the piezoelectric (7) signal, and the stored signal values of the switch (6) signal, as well as a selected one (10) of several sample signals stored at unit 19 and the scale-measurement data stored in memory at 36. The sample signal 10 will be understood to be a "good" signal, a so-called "template", averaged from many work-contacting procedures, and to be characteristic (a) for the currently applicable drive speed, (b) for the currently involved workpiece material, and (c) for the length of the currently installed probe pin. The course of sample signal 1C is shown in FIG. 6.

Figure 7:
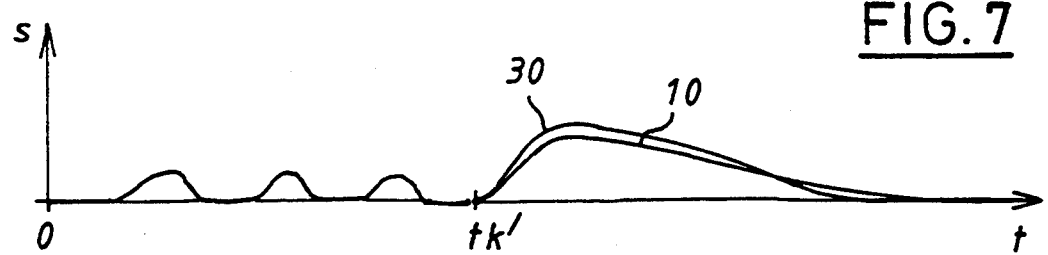

The microprocessor 20 correlates template 10 with the signal course 30 (FIG. 7), namely for different positions of the "template" 10 on the time axis (t), i.e., the "template" 10 is shifted on the time axis over the signal course 30, and the correlation factor is determined for various positions of the template on the time axis. If the correlation factor is above a preset limit value, then a first criterion for a valid work-piece contact has been satisfied, and the exact time (tk) of initial workpiece contact is thereupon determined.

The exact contact time (tk) is derived by the microprocessor from the course of the "template" signal 10 at the location on the time axis (t) for which the greatest value of the correlation factor has resulted. An "exact" contact time tk' is associated with the signal course of "template" 10, and the scale-counter readings stored for said time tk' accordingly establish the correct scale coordinates (xk, yk, zk) for the measurement point at time tk'.

The time-varying course of the signal of the mechanical switch 6 is treated in similar manner. This signal course is also correlated with a stored "good" signal course of another "template", analogous to "template" 10. Thereupon, a time (tb) for the opening of the mechanical contact of switch 6 is computed from the course of the signal of that mechanical-switch "template" for which the largest correlation factor results. Both times, the time (tb) and the time (tk') must be within a preset time window of, for example, 100 ms. If this is the case, a second criterion for a valid workpiece-contacting event has been satisfied. Otherwise, the measurement is repeated.

The microprocessor 20 transfers the computed coordinate values (xk, yk and zk) identified with time (tk) via a data bus 27 to the computer 5 of the coordinate-measuring machine.

In the embodiment described, the signal of the piezoelectric crystal 7 was filtered and rectified before storage. It is of course also possible to directly store the signal output from the preamplifier 24 and to take into account, for example, in addition to the a-c component, the d-c voltage component of the contact signal, as a plausibility check or in the determination of the exact time tk.

Instead of correlation, other methods of digital-signal processing can also be used. In the simplest case, for example, the subsequent filtering of the stored signal can be monitored as to whether, for example, a preset threshold value has been exceeded. In this connection, the stored signal can also be subjected in succession to several different digital-filtering processes, and the filtered signals can be checked as to meeting various criteria, such as signal intensity, signal duration, and frequency distribution.

What is claimed is:

1. A method of establishing coordinate measurements on a workpiece (9), using a probe head (2) of the switching type which produces a time-varying contact signal (28) which initiates upon contact with the workpiece, said method comprising the steps of:
  (a) contacting the workpiece to thereby produce a time-varying contact signal (28) initiated at a time (tk) and concurrently generating related measured-position values (x, y, z);
  (b) storing the time-varying contact signal (28) and related measured-position values (x, y, z) during at least an interval which spans time before, during, and after the time varying contact signal; and
  (c) subsequently computing (i) the exact contact-initiated time (tk) within the said interval, and (ii) interpolating from the stored measured-position values (x, y, z) contact coordinates (xk, yk, zk) corresponding to the exact contact-initiated time.

2. A method according to claim 1, in which the probe head (2) supplies, during the course of contact with the workpiece (9), two different time-varying signals (13; 13') from different sensors (6, 7), and the time-varying course of both signals is stored.

3. A method according to claim 2, in which the two signals are read into storage (19) via a multiplexer (16) in time-division multiplexing.

4. A method according to claim 1, in which the contact signal (13') is rectified before storage.

5. A method according to claim 1, in which the contact signal is digitally filtered after storage.

6. A method according to claim 1, in which, for the computation of the exact contact time (tk), a time-varying sample signal (10) is stored, and the stored contact signal (30) is correlated with the stored sample signal (10).

7. A method according to claim 6, in which the workpiece-contact procedure is repeated if the correlation drops below a predetermined limit value; and, if the correlation reaches or exceeds the limit value, the exact contact time (tk') is subsequently interpolated from the stored sample signal.

8. A method according to claim 6, in which the workpiece-contact procedure is repeated if the correlation drops below a predetermined limit value; and, if the correlation reaches or exceeds the limit value, the measured-position values at the computed exact contact time are subsequently interpolated from the stored sample signal.

9. A method according to claim 1, in which the contact signal (13') is filtered before storage.

* * * * *